Jan. 31, 1956     J. P. WATSON     2,732,719
GYROSCOPE
Filed March 22, 1954     4 Sheets-Sheet 1
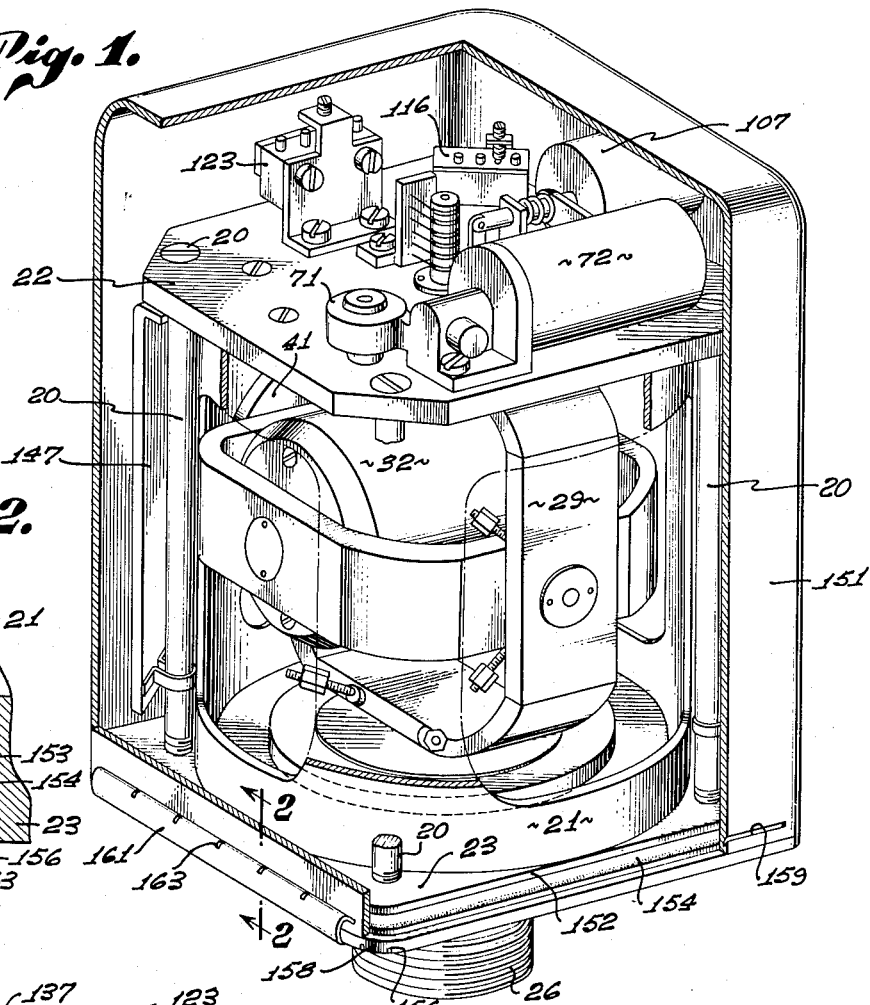
INVENTOR.
JAMES P. WATSON,
By Huebner, Beehler, Worrel & Herzig
Warren T. Jessup
ATTORNEYS.

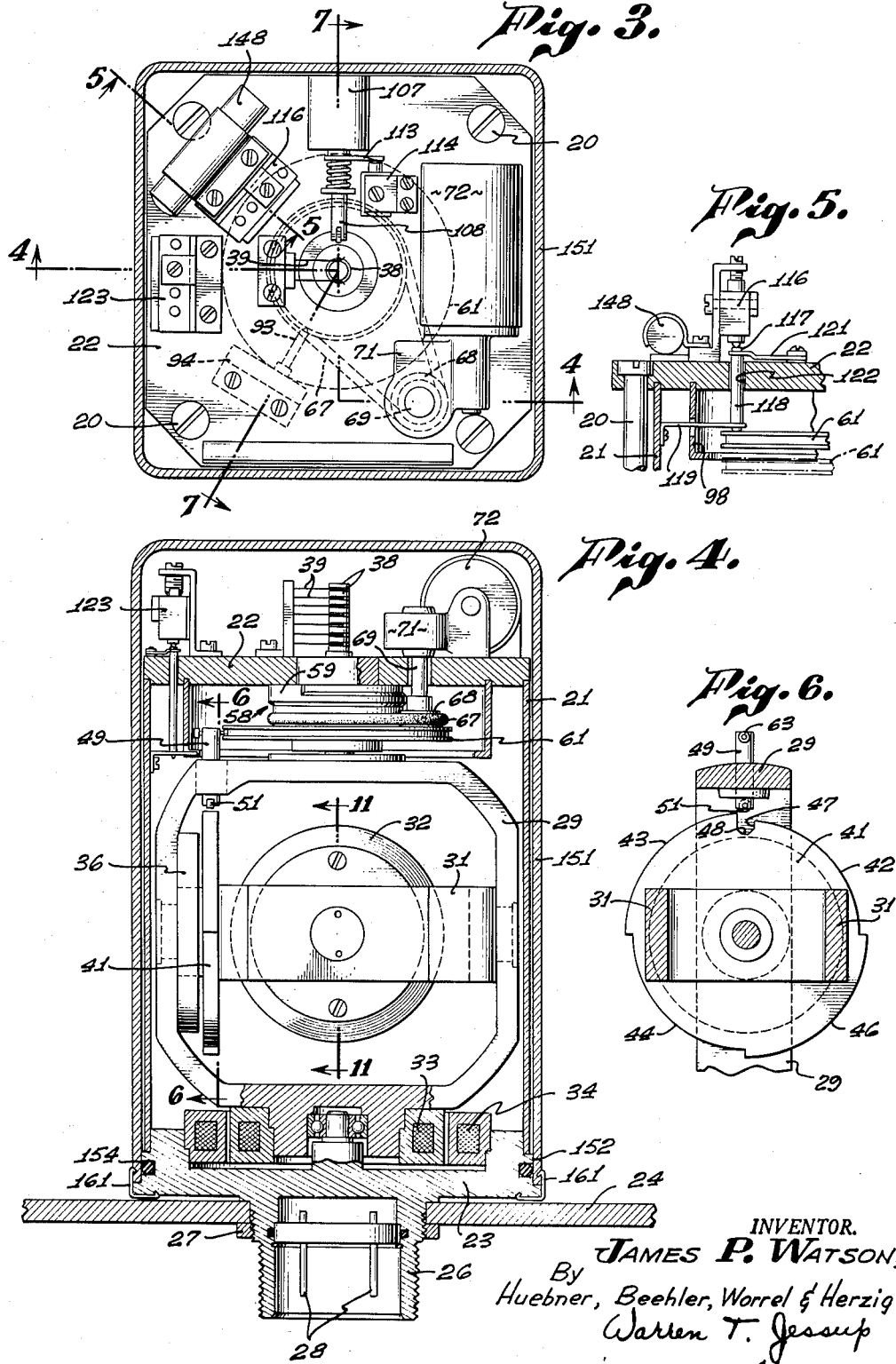

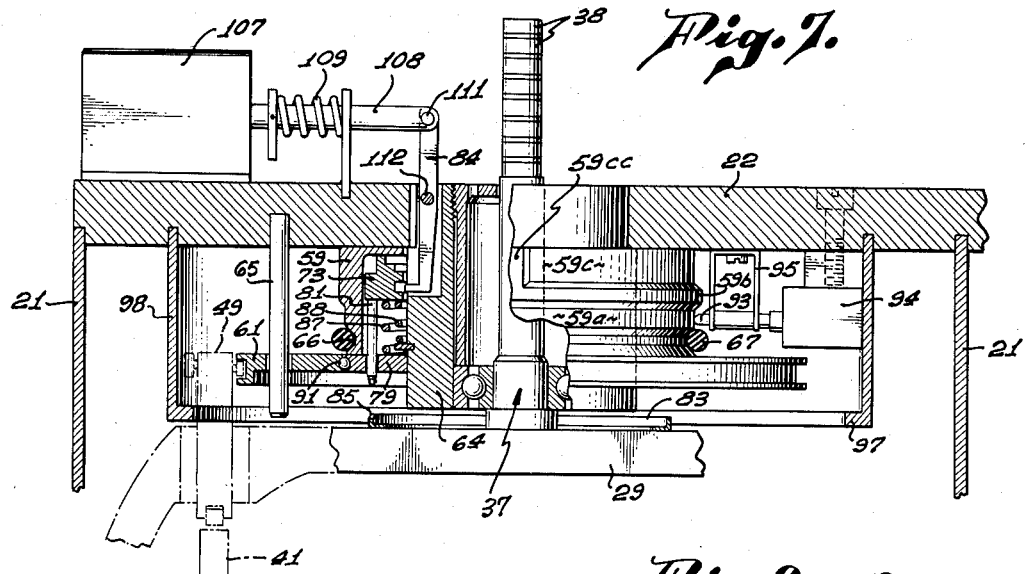
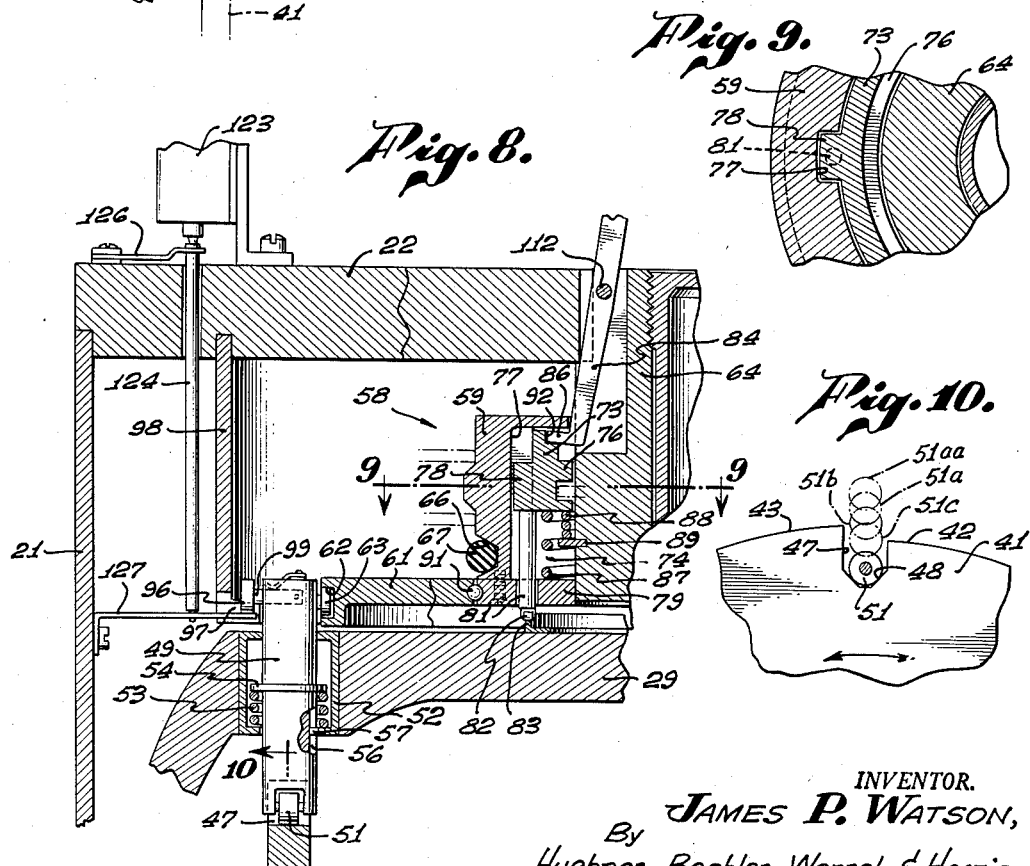

Jan. 31, 1956　　　J. P. WATSON　　　2,732,719
GYROSCOPE
Filed March 22, 1954　　　　　　　　　　　　4 Sheets-Sheet 4

INVENTOR.
JAMES P. WATSON,
By Huebner, Beehler, Worrel & Herzig
Warren T. Jessup
ATTORNEYS.

United States Patent Office 2,732,719
Patented Jan. 31, 1956

2,732,719

GYROSCOPE

James P. Watson, Lynwood, Calif.

Application March 22, 1954, Serial No. 417,598

15 Claims. (Cl. 74—5.1)

This invention relates to improved features in a gyroscope and particularly to an improved method and means for caging a gyroscope.

Air, land, and sea vehicles and other apparatus of all types make extensive use of gyroscopes for control purposes. The gyroscope forms a stable space reference against which the attitude of its vehicle may be compared at all times. Under certain circumstances it is desirable to bring the inner gimbal and the outer gimbal of the gyroscope into a predetermined attitude or relation with respect to the housing or frame of the gyroscope. Such an operation is known as caging, and when the inner gimbal and outer gimbal have been fixed in such a predetermined attitude with respect to the frame the gyroscope is said to be caged.

It is an object of this invention to provide an improved method and means for caging a gyroscope.

It is another object of this invention to provide a rapidly operating method and means for caging a gyroscope.

It is a further object of this invention to provide a method and means for caging a gyroscope which requires only a small amount of energy for the caging operation, and which subjects the gimbals and gimbal bearings of the gyroscope to only a low stress.

In many gyroscope uses the outer gimbal is free to rotate through 360°, although the inner gimbal is generally restrained by stop members to an operating range of perhaps 170°. The inner gimbal is generally thus restrained because, if the rotor shaft is allowed to become coaxial with the outer gimbal axis, there is danger of the outer gimbal spinning freely in response to the reaction torque from the rotor or gyroscopic wheel. However, though many gyroscopes thus permit a wide range of angular operations of both the outer and inner gimbals, many caging systems of the past have been so limited that they are capable of caging the gyroscope only when the inner gimbal and outer gimbal are within a relatively narrow angle to the caged position.

It is an object of this invention to provide a caging method and means whereby a gyroscope may be quickly caged from any operating position of its inner and outer gimbals.

Having caged the gyroscope, the time arrives when it must be uncaged, that is, the gimbals must be freed to turn freely with respect to the frame and each other in response to any change in attitude of the frame. If the uncaging is done slowly there is danger that undesired and false torques and precession may be suffered by one or both gimbals, thus starting the gyroscope off in the wrong attitude.

It is therefore an object of this invention to provide a caging means for a gyroscope which may be uncaged quickly.

Furthermore, in the uncaging operation it is essential that there be no unwanted kick or torque applied to the gyroscope during the uncaging procedure.

It is, accordingly, another object of this invention to provide a method and means for uncaging a gyroscope which is free from any danger of applying undesired torques to the gyroscope parts during the uncaging operation.

It is a further object of this invention to provide a method and means for caging a gyroscope in which the gimbals are brought into caged position through the shortest travel path, thereby minimizing caging time.

It is a further object of this invention to provide in a gyroscope caging mechanism improved means for sensing the position of the inner gimbal with respect to the outer gimbal and for sensing the position of the outer gimbal with respect to the frame.

It is a further object of this invention to provide such a sensing means as above which also serves as a latching means for latching the gimbals in caged position.

Many air vehicles, particularly missiles, are subjected to very high acceleration forces. These accelerations thus provide a powerful operating force which is capable of operating or actuating mechanism within the missile unless the mechanism is specifically designed to guard against such undesired or false operation.

It is an object of this invention to provide a gyroscope caging and uncaging means which is virtually free from danger of such false or faulty operation through high vehicle acceleration.

One of the most serious mishaps which might occur with the gyroscope mechanism of an air vehicle is to have the gyroscope accidentally caged during flight of the vehicle. Such caging of necessity means that the vehicle has lost its reference, which in most cases, results in complete loss of the vehicle.

It is an object of this invention to provide a fail-safe caging apparatus and method which will automatically revert to uncaged position of the gyroscope in the event of power failure in the caging circuit.

It is a further object of this invention to provide a caging and uncaging mechanism the bulk of which is mounted on the frame instead of on the gimbals, thereby minimizing the danger of unwanted movement of the gimbals under high acceleration forces, such as impact forces.

The mounting of the stationary portion of the spin motor or gyroscope wheel to the inner gimbal must be extremely precise and free from movement.

It is an object of this invention to provide an improved mounting for a gyroscope wheel shaft to the inner gimbal of the gyroscope.

In control mechanisms of the type here under consideration it is generally found necessary to provide several operating members or linkages whereby certain movement or positioning of one part may be transmitted to another part such as a sensing switch. The movement transmitting member must be mounted for its necessary movement with an absolute minimum of friction in order to be compatible with the small low power requirements of precision apparatus of this type.

It is, accordingly, an object of this invention to provide means for mounting a reciprocable actuating or operating member which is virtually free from friction in its operation.

In the assembly of a typical controlling gyroscope many wires are employed leading to and from the gyroscope. Generally, each wire is made to fulfill as many functions as it can in order to minimize the weight and space taken by the wiring.

It is an object of this invention to reduce to a further minimum the number of wires required to effectuate caging and uncaging of a gyroscope.

It is another object of this invention to provide a wiring system for a gyroscope caging circuit which requires only one wire, in addition to the two wires which are essential to carry the caging power, for the purpose of providing adequate control and indication of caging and uncaging.

In housing or in casing apparatus of the general type here under consideration, it is usually a relatively simple problem to seal the apparatus within the case when the case is cylindrical in form. Gyroscopes like some other types of equipment, however, generally lend themselves better to housings or cases having flat sides. Such cases have a tendency to bulge out along their straight or flat edges and where this tendency to bulge is most pronounced there results a consequent sealing problem.

It is an object of this invention to provide an improved seal for a container of rectangular form which is uniquely adapted to resist this tendency to bulge on the flat sides.

In accordance with these and with other objects which will become apparent thereinafter, certain preferred forms or embodiments of the present invention will now be described.

The method and means of the present invention involves essentially successive caging of the inner gimbal followed by caging of the outer gimbal. While it is recognized that in a certain sense the inner gimbal cannot be regarded as actually caged until it is anchored in a predetermined relation with respect to the frame, it has been found expedient herein to regard the inner gimbal as being caged when it is brought to a predetermined position with respect to the outer gimbal with respect to which it is pivotally mounted, and to regard the outer gimbal as being caged when it is brought to a predetermined position with respect to the frame in which it is mounted. Thus the gyroscope itself is not caged until both the inner gimbal and the outer gimbal have been successively caged.

In the present invention the caging operation involves essentially a sensing of the position of the inner gimbal with respect to the outer gimbal. Following this sensing the inner gimbal is rotated in the correct direction to bring it to caged position within the outer gimbal. This caged position is generally one in which the spin motor axis is substantially perpendicular to the outer gimbal axis, although this particular relative attitude is not necessarily essential to the practice of the present invention. This initial sensing of the position of the inner gimbal within the outer gimbal is important in order to prevent the inner gimbal from being driven in the wrong direction which would bring it up against one of its two limit stops thereby subjecting its parts to unwanted strains and stresses and further thwarting one of the important objects of this invention which is to bring the gimbals to their relative caged positions in the shortest time possible.

Following caging of the inner gimbal with the outer gimbal, the inner gimbal is latched or secured to the outer gimbal in caged position.

Next the position of the outer gimbal within the frame is sensed. Except in cases where the outer gimbal does not have 360° of freedom, this sensing is not essential to the operation of the apparatus, inasmuch as the outer gimbal is free to turn completely through many revolutions; however, it is highly desirable in order that the controlling mechanism may know in which direction to drive the outer gimbal in order to bring it to caged position with respect to the frame in a minimum time. When the outer gimbal has been properly positioned and latched to the frame, caging is complete.

In the present invention the uncaging is performed in a minimum time by so designing the mechanism that all of the parts which effect the uncaging move in a short straight line as will become more fully apparent hereinafter. At the same time in one form of the present invention the dangerous forces of high acceleration which might cause unwanted operation of the parts are circumvented by using a drive mechanism which is rotary in its operation and therefore not subject to the high linear acceleration mentioned hereinbefore.

A detailed description of certain forms of the present invention follows.

Referring to the drawings, Figs. 1 through 14 inclusive illustrate a first embodiment of the present invention and Figs. 15 and 16 indicate certain modifications which may be made thereto if desired.

Fig. 1 is a perspective view with certain parts partially broken away more clearly to illustrate the interior of the gyroscope.

Fig. 2 is a fragmentary section taken on line 2—2 in Figure 1.

Fig. 3 is a cross sectional plan view looking down on the top of the gyroscope with the outer housing or case cut through.

Fig. 4 is a sectional elevation taken on the broken section line 4—4 in Fig. 3.

Fig. 5 is a fragmentary section taken on line 5—5 in Figure 3.

Fig. 6 is a fragmentary sectional view taken on line 6—6 in Fig. 4.

Fig. 7 is a partial sectional view taken on the angled section line 7—7 of Fig. 3.

Fig. 8 is a fragmentary sectional view taken generally on the same lines as Fig. 4, but showing certain parts broken away and in greater detail.

Fig. 9 is a fragmentary cross-section taken on a line 9—9 in Fig. 8.

Fig. 10 is a fragmentary view generally similar to Fig. 6 and taken on line 10—10 in Fig. 8.

Fig. 14 is a schematic diagram illustrating the operating circuit of the gyroscope.

Figure 11:
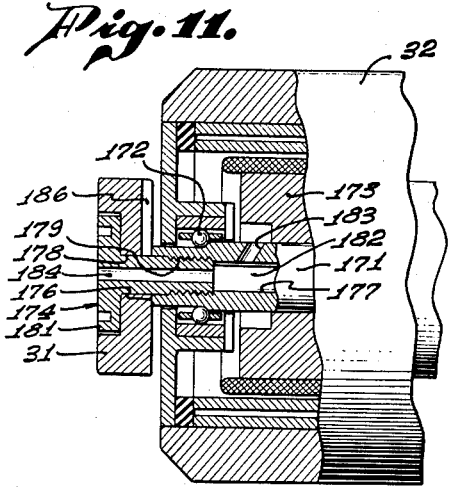
Fig. 11 is a fragmentary section of the gyroscope spin motor taken on line 11—11 in Fig. 4.

Referring to the drawings, 21 designates a generally cylindrical skeleton-like frame including a top plate 22 and a bottom plate 23. The frame is held together by four bolts 20 (Fig. 1) which clamp the plates 22 and 23 together using the cylindrical frame member 21 as a spacer. The gyroscope is mounted to any suitable support 24 by providing a downwardly extending axial member 26 formed on the bottom plate 23 and passing through a mounting opening in the support 24. A nut 27 serves to clamp the gyroscope to the support 24. By thus mounting the gyroscope at only one position internal stresses in the gyroscope casing and frame are avoided no matter how tight the nut 27 may be screwed up. The mounting member 26 also constitutes a convenient means for passing electrical connecting wires (not shown) into the gyroscope. For this purpose pin connectors 28 are mounted within the axial connecting member 26.

Mounted within the frame 21 for rotation about a vertical axis is an outer gimbal 29. Rotatably mounted within the outer gimbal 29 for rotation about a generally horizontal axis is an inner gimbal 31. Rotatably mounted within the inner gimbal 31 for rotation about an axis perpendicular to the inner gimbal axis is a gyroscopic wheel or rotor 32.

Affixed to the lower end of the outer gimbal 29 is an annular member 33 and immediately circumjacent thereto is another annular member 34 affixed to the end plate 23 of the frame 21. Together the members 33 and 34 constitute a pick-off means, the details of which are not shown and which are well known in the art. Such a pick-off means may be magnetic, electrostatic or may constitute an actual physical contact as by potentiometer. The pick-off means serves to generate a unique signal which may be taken out through the pin connectors 28 to indicate the position of the outer gimbal 29 with respect to the frame 21. In similar manner a suitable pick-off mechanism, shown schematically at 36, is employed to detect and pick-off the position of the inner gimbal 31 with respect to the outer gimbal 29.

The upper mounting shaft 37 of the outer gimbal 29 supports a plurality of slip rings 38 which are contacted by brushes 39, by means of which power and signals may be transmitted to and from the inner portions of the gyroscope. A second set of rings and brushes (not shown) completes these circuits from the outer to the inner gimbal to supply pick-off and the drive motor of the gyroscopic wheel 32. Such means are well known in the art and will not be described further in this specification.

In accordance with the present invention, means are provided for sensing the position of the inner gimbal 31 with respect to the outer gimbal 29. Such sensing means includes a disc 41 secured to the inner gimbal 31. Over approximately 90° of its arc the disc 41 is provided with a segment 42 having a given radius, and over an adjacent 90° segment 43 the disc has a slightly larger radius. The segment 44 opposite the segment 42 is the same radius as the segment 42 and the segment 46 opposite the segment 43 is the same radius as the segment 43. These latter two segments 44 and 46 do not constitute operating portions of the disc 41 but are so proportioned simply to provide balance for the assembly. At the juncture between the segments 42 and 43 is a notch 47 having a tapered bottom portion 48.

Reciprocably mounted in the outer gimbal 29 in position to register with the disc 41 is a latching and sensing member, probe 49. At its lower end the probe 49 is provided with a roller 51 engageable with the periphery of the disc 41. The member 49 reciprocates in a cup-like mounting shell 52 secured through and within the gimbal 29, as shown in Fig. 8. A compression spring 53 acting between the shell 52 and a shoulder 54 on the probe 49 urges the probe 49 to its upper position away from the disc 41. A key-way 56 in the probe 49 mates with a small projection 57 formed on the shell 52 to prevent rotation of the probe 49 in the gimbal 29 while still permitting reciprocation thereof.

The probe 49 is moved up and down in its sensing operation by means of a ring-like actuating member 58 including a central hub portion 59 and an annular plate 61 journalled to the central portion 59. The plate 61 is circular and has a peripheral groove 62 therein in which rides a wheel 63 extending from the upper end of the probe or member 49 into the groove 62. Plate 61 is prevented from turning by a key 65 projecting downward from plate 22, which however does not impede its axial movement. In the uncaged condition there is no contact between wheel 63 and plate 61.

The top plate or member 22 of the frame 21 has a central portion 64 depending therefrom and around this portion 64 is mounted the ring-like hub portion 59 which is rotatable therearound and also axially movable thereon. The central hub 59 is rotated by being provided with a pulley groove 66 in which rides a belt 67, the belt also encircling a drive pulley 68 secured to a shaft 69 journalled in the plate 22 and extending therethrough. The upper end of the shaft 69 extends into a gear box 71, power for which is derived from a small electric drive motor 72. When the motor 72 is energized the central hub portion 59 of the actuating member 58 will be rotated. Rotation of the actuating member 58 serves to apply a torque to the outer gimbal 29 whenever the hub 59 is latched to the gimbal 29, as will now be described.

Latching of the hub 59 to the gimbal 29 is effected through a driving ring 73 located within an internal cavity 74 formed in the hub 59 and concentric with the hub 59.

The driving ring 73 is provided with internal threads 76 and is keyed to the hub 59 by the provision of a key-way 77 formed in the hub 59 which mates with a key 78 formed on the ring 73.

Secured to the ring 73 and extending downwardly through an opening in the bottom plate 79 of the hub 59 is a torque pin 81; to the lower end of the torque pin 81 is rotatably mounted a small roller 82. The mounting of the roller 82 to the torque pin 81 is resilient and slightly movable so that the roller may move up and down slightly with respect to the pin 81 but is biased to its downward position. The roller 82 comes into rolling engagement with a torque ring or rail 83 having a notch therein at a certain predetermined point in which the roller 82 may engage to latch the actuating member 58 to the outer gimbal 29. When thus latched to the gimbal 29, the actuating member 58 serves to apply a torque to the gimbal 29.

The actuating member 58 is moved downwardly with respect to the frame 21 by the provision of a pivoted thread engaging member 84 having at its lower end a toe 86 which may be selectively moved outward into engagement with the thread 76 in the driving ring 73.

If desired a plurality of members 84 may be provided spaced circumferentially about ring 73 in order to prevent cramping. Such members 84 may be actuated by a common solenoid 107.

When the hub 59 is rotating and the toe 86 is engaged in the thread 76, the rotation of the ring 73 effected through the keying 77—78 causes the ring 73 to screw downwardly within the hub cavity 74.

This downward screwing of the driving ring 73 is transmitted to the central hub 59 through an annular compression spring 87 located coaxially in the cavity 74. In thus screwing down, the ring 73 also operates against the upward bias of a spring 88, the lower end of which rests on an annular ledge 89 secured to the central frame member 64.

Thus as the actuating member 58 is moved down by the action of the driving ring 73, the probe member 49, and more particularly the roller 51 thereof, is brought into engagement with the periphery of the inner gimbal disc 41. The annular plate 61 is preferably journalled for free rotation with respect to the central hub 59 by means of a series of ballbearings 91. This is done in order to minimize friction between the non-rotating plate 61 and the rotating hub 59 during caging. Bearing 91 and key 65 may be omitted if desired, uniting parts 61 and 59. The only effect of this simplification would be to introduce a slight torque on the outer gimbal through roller 63.

As the driving ring 73 screws down pressing the actuating member 58 ahead of it, the roller 51 of the probe 49 engages either the segment 42 or the segment 43 of the disc 41. It is possible that the disc 41 may be already in caged position so that the roller 51 enters directly into the notch 47. This would simply accelerate the whole procedure as will presently be seen hereinafter. Engagement of the roller 51 with the disc 41 brings to a halt the downward motion of the actuating member 58, thus the initial axial position of the central hub 59 is determined by the angular position of the inner gimbal 31 in the outer gimbal 29.

The driving ring 73 continues to screw down until the roller 82 engages the torque rail or ring 83. At this moment the thread engaging toe 86 snaps into an annular groove 92 formed at the upper end of the thread 76 and of somewhat larger radius. In this position the ring 73 may be rotated in either direction and still remain held down by the toe 86, for rotation of the hub member 59 then continues in one direction or the other until the roller 82 snaps into the V-notch 85. Thus the outer gimbal 29 is positively latched to the central hub 59 and further torque applied through the belt 67 results in the application of a torque in one direction or the other to the outer gimbal 29.

As has been pointed out hereinbefore, in the initial downward movement of the actuating member 58, it is first stopped in a position dependent upon the angular attitude of the inner gimbal 31. This attitude is sensed by a mechanism including certain peripheral concentric cam surfaces formed on the outside of the central hub 59. The lower of these cam surfaces is disposed immediately above the pulley groove 66 and is denominated 59a. Immediately above the cam surface 59a is an annular cam surface 59b of larger radius than 59a. Above the surface 59b is a cam surface 59c.

The axial region corresponding to the surface 59c is divided angularly into two portions, the first portion being denominated 59c as shown in Fig. 7 and being of radius equal to that of 59a. This arcuate segment is approximately 180°, the remaining 180° of this axial region being occupied by a cam section 59cc which is of radius equal to that of section 59b.

The above mentioned cam surfaces actuate a probe 93 which in turn actuates a reversing microswitch 94 mounted to the upper frame plate 22. The switch actuating probe 93 is secured to the upper frame plate 22 for limited longitudinal reciprocation by a U-shaped leaf spring member 95, the details of which are essentially similar to those described hereinafter in connection with Fig. 5 to which reference is made for further understanding. The switch 94 is single pole double throw. When the actuating member 58 is in upper position as shown in Fig. 7 the actuating probe 93 is in engagement with the surface 59a and the switch 94 is in its upper position in Fig. 14. If in the initial downward movement of the actuating member 58 the roller 51 comes into engagement with the higher cam segment 43, the cam surface 59a is still in engagement with the switch operating probe 93. If, however, the roller 51 is in registry with the segment 42 so that it does not engage the disc 41 until it has moved down far enough to touch the segment 42 then the cam surface 59b has been brought into engagement with probe 93 and the switch 94 has been actuated to its lower position in Fig. 14.

The mechanism thus described constitutes a means for sensing and translating angular position of the disc 41 into a desired linear position of the reversing switch 94 to control precession of the inner gimbal 31 either clockwise or counter-clockwise in order thereby to bring the roller 51 into engagement in the notch 47. The circuit for effecting this selective precession of the inner gimbal and the operations thereof will be described hereinafter. The inner gimbal is precessed in the desired direction by applying a torque in the proper angular direction to the outer gimbal 29. This torque is applied through the torque pin 81, acuating member 59 and belt 67 by the motor 72.

The inner gimbal is thus rotated by precession in the proper direction until the roller 51 drops into the notch 47. When the roller 51 is thus in registry with the notch 47 it does not drop all the way down to the bottom but drops to an intermediate position shown at 51c in Fig. 10. It is prevented from dropping all the way down by the engagement of a small wheel 96, extending outwardly from the top of the probe 49, with a track 97 formed by an inturned flange on a depending cylindrical track support 98 mounted to the upper frame plate 22. The track 97 is concentric with the outer gimbal 29 as shown in Fig. 7 and extends all the way thereuaround.

Figure 12:
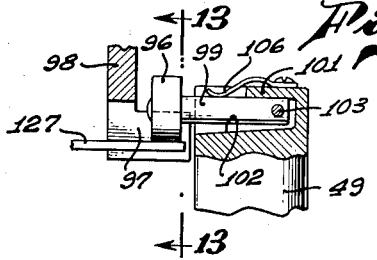
Fig. 12 is a fragmentary view taken generally in the same plane as Fig. 8 but with certain parts broken away for added clarity.

Fundamentally the wheel 96 is mounted on an arbor 99 which is essentially fixed with respect to the probe 49 but which in practice is actually mounted for a slight vertical adjustment because of manufacturing tolerances as will be explained more fully hereinafter. In thus coming to rest on the rail 97 the wheel 96 causes the arbor 99 to be pressed against an overhanging ledge 101 formed above the slot 102 in the mounting probe 49 in which the arbor 99 is journalled by a pivot pin 103 (Fig. 12). When the roller 96 is thus engaged to roll on the rail or track 97, the roller 51 on the bottom of probe 49 is in the position 51c in Fig. 10. This essentially locks the inner gimbal with respect to the outer gimbal in caged position of the inner gimbal. There is a slight tolerance in this locking or latching action, however, represented by the difference in width between the notch 47 and the diameter of the roller 51. This loose fit is provided in order to preclude any jamming of the parts.

With the probe 49 in this position the actuating member 59 is in such a position that the reversing switch probe 93 is in engagement with either the cam segment 59c or 59cc. Thus the reversing switch 94 is in whichever position will cause the outer gimbal 29 to be rotated to caged position through the minimum distance and hence in the minimum time.

The caging of the outer gimbal with respect to the gyroscope frame 21 is effected through the provision of a V-notch 104 (Fig. 13) formed at a preedtermined position in the frame track 97. When the outer gimbal 29 has been rotated in the proper direction by the actuating member 58 until the wheel or roller 96 is in registry with the V-notch 104, the wheel 96 snaps down into the notch 104 thus allowing the entire assembly to which it is mounted to drop down a slight distance. This now permits the roller 51 to drop fully into engagement with the lower V surface 48 of the notch 47 thus firmly latching the inner gimbal to the outer gimbal without play or creep. At the same time the outer gimbal is latched in similar manner to the frame 21 by the engagement of the wheel or roller 96 in the V-notch 104.

It is quite important that both gimbals be latched in their caged position without play or back lash and to this end the latching notches are both made in V shape. However, since the same member namely the probe 49 carries both of the caging rollers 51 and 96, the roller 96 is mounted with the slight up and down freedom described hereinbefore in connection with Fig. 12. To this end a small leaf spring 106 is mounted to the upper end of the probe member 49 and bears downwardly on the arbor 99 to keep the wheel 96 pressed into engagement with the V-notch 104. The spring 106 is quite firm but is not strong enough to overcome the general downward pressure exerted on the assembly generally by the spring 87 backed by the driving ring or nut 73.

The caging operation is instituted by energization of a solenoid 107 mounted atop the upper plate 22 and having a plunger 108 extending therefrom. A compression spring 109 biases the plunger 108 to inward position. The outer end of the plunger 108 is pivoted at 111 to the pivoted thread engaging member 84 which is in turn pivoted to the upper frame plate 22 at 112. Thus when the plunger 108 is moved outward the thread engaging toe 86 is moved into engagement in the thread 76.

The plunger 108 carries a laterally extending arm 113 which engages a "transfer" microswitch 114 (Fig. 3). The switch 114 is a single pole double throw switch (Fig. 14) and is so positioned as to be actuated from one position to the other when toe 86 snaps into the upper circular groove 92 in the driving ring 73. The transfer switch 114 serves to transfer control of the motor 72 to the reversing switch 94 as seen by reference to Fig. 14.

As the annular plate 61 of the actuating member starts to move down an "uncaged" microswitch 116 (Fig. 5) is caused to be actuated. The switch 116 is a simple single pole, single throw switch which is in closed position when the annular plate 61 is in uppermost position and is in open position at all other times. This open position is produced by a small spring located inside the switch which operates as soon as pressure is removed from the actuating member 117.

Switch 116 is actuated by up and down movement of plate 61 through a vertical, reciprocably mounted actuating pin 118, the upper end of which engages the member 117, the lower end being engaged by plate 61. The pin 118 is relieved at each end and the relieved portion fits into a hole formed in the respective ends of a pair of leaf spring members 119 and 121. As shown in Fig. 5 the pin 118 passes through the upper frame plate 22 by means of a bore 122 which is sufficiently larger than the pin 118 to provide complete clearance. Each of the leaf spring members 119 and 121 is appreciably wider than it is thick, and each is appreciably longer than it is wide. One end of the leaf spring member 121 is mounted to the plate 22 of the frame 21 and the other leaf spring member 119 is mounted at one end to the cylindrical frame member 21. The respective free ends of the members 119 and 121 are substantially aligned vertically and receive the respective ends of the pin 118 as mentioned hereinbefore. The combination is biased away from switch 116 sufficiently to resist anticipated acceleration forces that would tend to utilize the mass of actuator 118 to operate switch 116. This also relieves switch 116 of the added work of displacing actuator 118 before it can reset itself to the open position. This arrangement insures that switch 116 will open without fail as soon as plate 61 starts to move down.

The pin 118 is thus mounted for limited back and forth (in this case up and down) movement without any rubbing friction of any kind and with the possibility of sticking completely eliminated. Although the path of movement of each end of the pin 118 is slightly arcuate, the angle covered by the arc is so slight by virtue of the fact that the switch 116 is a micro-switch requiring very small travel for actuation, that it is in effect a linear movement which is virtually friction free. In unstressed position of the leaf spring members 119 and 121 their free ends are spaced apart a distance slightly less than the opposite shoulders formed where the pin 118 is relieved at each end. Thus the pin 118 is held firmly in engagement between the members 119 and 121.

The purpose of the uncaged switch 116 is to indicate to the external sensing and controlling circuit that the gyroscope is fully uncaged.

Figure 13:
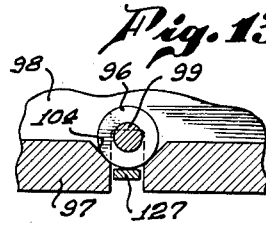
Fig. 13 is a fragmentary section taken on line 13—13 in Fig. 12.

The uncaged switch 116 has its counterpart in a caged switch 123 (Fig. 8) mounted atop the upper frame plate 22, and actuated by a reciprocable actuating pin 124. The pin 124 is mounted for limited longitudinal reciprocation between a pair of leaf springs 126 and 127, in a manner similar to that described hereinbefore in connection with the pin 118, except that the spring 127 urges pin 124 strongly toward switch 123 so as to maintain the switch in the operated position (the upper position in Fig. 14) except when spring 127 is forced and held down by roller 96. The leaf spring 127 extends beyond its link with the pin 124 and serves also as an actuating member effective to be engaged by the roller or wheel 96 when the wheel 96 drops into the V-notch 104 in the track 97, as shown in Fig. 13.

The caged switch 123 is a single pole, double throw switch which is maintained in its lower position in Fig. 14 whenever the leaf spring member 127 is engaged by the roller 96, and which is in its upper position in Fig. 14 at all other times.

The principal function of the caged switch 123 is to indicate to the external circuit that the gyroscope is fully caged.

The circuit involved in the present invention is shown in Fig. 14 wherein the dotted line 134 represents schematically the confines of the gyroscope itself. Leading to the gyroscope are a pair of power conductors 136 to which is applied a conventional power supply, as for example, 110 volts D. C. In one of the conductors is an external switch 137 selectively operable to effectuate the caging operation of the gyroscope. When the switch is open the gyroscope is uncaged, and if already caged will revert to uncaged position, as will be described hereinafter.

It will be noted that the solenoid 107 is connected directly across the full 110 volts but that a voltage dropping resistor 138 is interposed in the circuit to the motor 72 which is generally a 28 volt D. C. motor. The resistor 138 drops the voltage down to approximately 56 volts. This voltage is further split in two by a pair of series connected impedance means in the forms of resistors 139 and 141. The motor 72 is connected between the juncture point between these resistors 139 and 141 and the switch arm of the double throw reversing switch 94 when the transfer switch 114 is in the lower position. Thus when the switch 94 is in upper position the current will flow from right to left in the motor 72 with the circuit being completed through the resistor 141, and when the switch 94 is in the lower position current will flow from left to right, with the circuit being completed through the resistor 139. In this way the direction of motor rotation may be changed by means of a simple single pole, double throw switch at 94.

All of the switches in Fig. 14 are shown in the attitude which they assume when the gyroscope is uncaged, that is when the circuit is de-energized, as by opening of the external switch 137. As the gyroscope completes its caging operation, the last step is for the switch 123 to move from its upper to its lower position, thereby de-energizing the motor 72 and leaving only the solenoid 107 energized to keep the driving ring or nut 73 depressed through continued engagement by the thread-engaging lever 84. The uncaged switch 116 is open at all times except when the gyroscope is completely uncaged. Its function is to indicate through the indicating conductor 142 that the gyroscope is fully uncaged.

Such indication is made through a pair of lights 143, which is a green light, and 144, which is a red light. Voltage dropping resistors 146 are connected in series with the lights 143 and 144 simply to dissipate the excess voltage, since the lights 143 and 144 are generally designed for less than the full circuit voltage.

In the uncaged position, shown in Fig. 14, current flows through the green lamp 143, thence across the bridging conductor 142 and switch 116 to the other side of the line through the resistor 138. The resistance of 138 is so low compared to the resistances 144 and 146 that for practical purposes it may be regarded as a shunt circuit around the red lamp 144 so that the red lamp does not glow at all. In the caged position of the gyroscope the switch 123 is in its lower position and the switch 116 is open. Under this circumstance it is the green lamp 143 which is shunted while the red lamp 144 receives the full line voltage, compensated for of course by its series resistance 146; thus the red lamp glows fully and the green light is out when the gyroscope is fully caged.

During the caging or uncaging operation, that is when the parts are operating in the manner which will be described hereinafter, the switch 123 is in its upper position while the switch 116 is open, thus the line voltage is applied in series across the two lamps 143 and 144, and each lamp will glow dully to indicate that the parts are in operation and that the gyroscope is neither caged nor uncaged fully.

It is to be understood that in addition to the D. C. control and caging circuit, illustrated in Fig. 14, other circuits are brought into the gyroscope for furnishing power for the gyroscopic wheel and also for pick-off purposes, as described hereinbefore. The gyroscopic wheel power may be alternating current and such power is also employed for heating the gyroscope through a plurality of elongate heaters 147 which are strapped to the clamping bolts 20 (Fig. 1). The current through the heaters 147 is controlled by the thermostatic element 148 (Fig. 3) which is spaced away from the heaters 147 and separated therefrom by the upper frame plate 22.

It is important that the gyroscope be well sealed against entry of deleterious elements and to that end a special sealing means is provided, as hereinafter described. Setting over the entire gyroscope is an open-ended case 151. The bottom plate 23 of the gyroscope frame constitutes a closing plate closing the end of the case 151, as best is seen in Figs. 2 and 4. The lower plate 23 is provided with a relieved portion 152 which fits within the open bottom end of the case 151. Circumjacent the periphery of the relieved portion 152 is a groove 153 having a resilient sealing O-ring 154 seated therein which is slightly compressed between the bottom of the groove 153 and the inside surface of the case 151 to form a continuous seal around the bottom plate 23, between the plate 23 and the case 151.

In order to keep the case 151 clamped firmly to the bottom plate 23, the outer face of the plate 23 is provided with a groove 156 which is adjacent and paralleling each of the four edges of the plate 23. As best seen in Fig. 2, the groove 156 is slanted outwardly toward the edge 157 of the plate 23. Because of the fact that the corners of the plate 23 and the case 151 are rounded, as shown at 158 (Fig. 1), each of the four grooves 156 opens onto the rounded portion of the corners, as shown in Fig. 1.

Each of the four sides of the case 151 is provided with a similar groove 159 which is adjacent and parallel to the bottom edge 157. The grooves 159 likewise are slanted outwardly toward the edge 157 as shown in Fig. 2, residing in the grooves 156 and 159 on the respective four sides of the case are four C-shaped channel members 161 having re-entrant flanges 162 engaged in the grooves 156 and 159 to clamp the case 151 firmly down against the bottom plate 23. The channel members 161 are slipped into the respective grooves 156 and 159 from the corners of the case since each of the grooves 156 and 159 communicate with the edge of the plate and case, respectively, as best seen in Fig. 1.

The channel members 161 are provided with partial transverse slots 163 which give a certain flexibility to the channel members so that each channel member functions as a plurality of individual segments in securing its particular portion of the case 151 to the bottom plate 23.

The overall effect of this manner of mounting is to provide a very firm clamping of the case 151 to the bottom plate 23, particularly at those portions of the casing edge located between any two adjacent corners. It is at this region where the ballooning effect of the rectangular case is most acutely felt, that is to say, there is rarely any clamping problem at the corners where the geometry of the parts insures rigidity but there is a tendency intermediate the corners for the edges of the casing to pull away from the closing plate. By the present clamping method, such tendency is overcome by the relatively firm channel members 161 which exert a downward force to secure case 151 to plate 23 and an inward force to maintain contact between case 151 and seal ring 154. These clamps have the added advantages that they can be installed and removed without special tools and once in place will not loosen or change position under the most severe conditions.

While the channel members 161 have been described as being slipped in from the respective edges of the grooves 156 and 159, it is possible also to construct them with sufficient resilience so that they may be snapped into the grooves directly from the sides instead of being slid in from the ends.

In any event it is preferred to make the member 161 sufficiently resilient that they will recover from any distortion due to temperature cycling of the secured parts.

It is important in the mounting of the gyroscopic wheel or rotor that there be no shifting whatever between the rotor shaft and the inner gimbal to which it is mounted. In accordance with the present invention means are provided for insuring such a firm mounting.

Referring to Figs. 11, the rotor 32 is shown mounted rotatably to a shaft 171 by means of ball bearings 172. In the present instance the rotor is on the outside of the stator 173 which is affixed to the shaft 171. This provides the spinning mass with its greatest moment of inertia by placing the mass as far from the rotative axis as possible. This of course is desirable in any gyroscopic equipment.

The shaft 171 is fitted within the inner gimbal 31 and is secured firmly thereto in accordance with the present invention by a securing pin 174. As seen in Fig. 11, the shaft 171 is butted against the inner gimbal 31 at 176. The shaft 171 and the gimbal frame 31 have aligned bores 177 and 178 respectively, of equal diameter. The bore 177 in the shaft 171 is continued by a threaded bore 179 having a slightly smaller diameter than the bore 177 and forming a coaxial inner continuation thereof. The inner end of the pin 174 is reduced slightly in diameter and is threaded to engage the bore 179 in the shaft. The unthreaded smooth portion of the pin 174 is fitted closely within the aligned bores 177 and 178.

The outer surface of the gimbal frame 31 is recessed to receive the head 181 of the pin 174 which thus bears against the gimbal 31 to hold the shaft 171 in close butting engagement with the inside surface of the gimbal 31.

The construction illustrated in Fig. 11 results in the shear forces being resisted by the closely fitting pin 174 at the butting plane 176 while separation forces between the gimbal 31 and the shaft 171 are resisted by the threaded engagement of the inner end of the pin 174 in the threaded bore portion 179 and the head 181 bearing against the gimbal 31. The net result is a precise firm fitting which is capable of resisting normal wear and tear and high shock forces without measurable shift between the rotor and the gimbal.

The shaft 171 is hollow as shown at 182 and communicates with the stator 173 through an outward passage 183. Through this passage wires are led into the stator through the pin 174 which is also hollow as shown at 184. To accommodate the wires during assembly of the gyroscope wheel to the gimbal 31 a lateral groove 186 is formed inside the gimbal 31. These wires reside in the groove 186 during the last phase of the assembly just as the shaft 171 is moved into butting relation within the gimbal 31.

Figure 15:
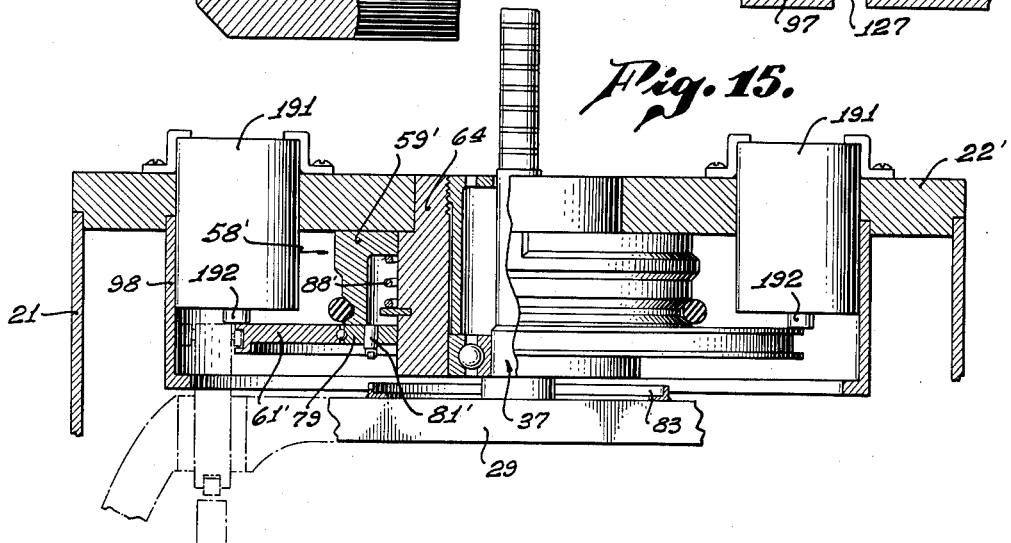
Fig. 15 is a view generally similar to Fig. 7 but showing a modified form of the present invention.

An alternative means of moving the actuating member 58 downward is shown in Fig. 15. In this embodiment the driving ring or nut 73 is eliminated and is replaced by one or more solenoids 191 mounted in the upper frame plate 22'. The plungers 192 of the respective solenoids 191 bear against the annular plate 61' and press the actuating member 58' down directly into engagement with the gimbal. In the embodiment shown in Fig. 15 the torque pin 81' is secured directly to the central hub portion 59' of the actuating member. Also eliminated are the solenoid 107; switch 114; arm 84 and spring 87 of the first embodiment. The other parts of the assembly are essentially the same and the operation of this embodiment is essentially the same as the first embodiment.

Figure 16:
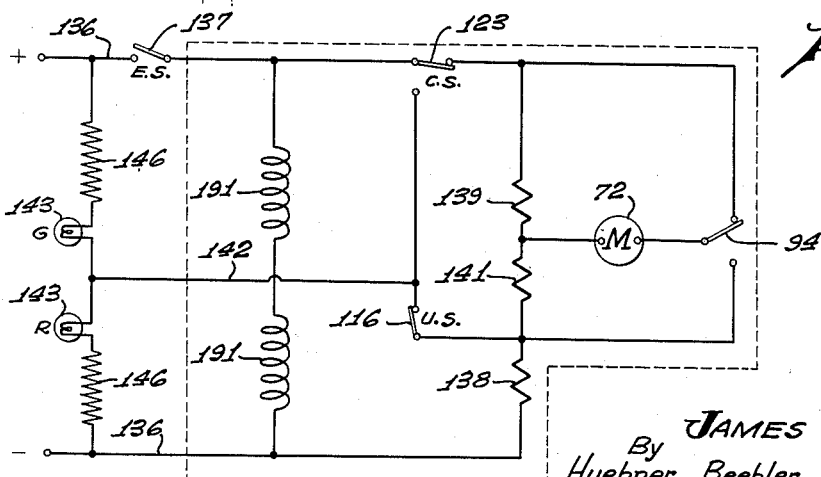
Fig. 16 is a modified form of wiring diagram employed with the gyroscope of Fig. 15.

The wiring of the embodiment shown in Fig. 16 is essentially similar to that shown in Fig. 14 except that the solenoids 191, which are connected in series, replace the solenoid 107 and the transfer switch 114 is eliminated.

Operation

The operation of the apparatus described hereinbefore will now be described with particular reference to Figures 7, 8, and 14.

When the switch 137 stands open the gyroscope is uncaged and the green light 143 is lit, which will indicate this condition. Caging is instituted by closing the switch 137 and leaving it closed. Closing of the switch 137 applies voltage simultaneously to the solenoid 107 and the motor 72 through the transfer switch 114. Energizing of the motor 72 causes the central hub portion 59 to be rotated in a given direction by the belt 67. At the same time the solenoid 107 causes the thread engaging toe 86 to engage the bottom portion of the thread 76 (Fig. 8) in the driving ring 73.

Rotation of the hub 59 is imparted to the ring 73 through the key 78 and causes the ring 73 to be screwed downward. As the ring 73 moves downward within the cavity 74, it presses the actuating hub 59 ahead of it through the intermediacy of the spring 87.

Initial downward movement of the annular plate 61 causes operation of the uncaged switch 116 through the pin 118 (Fig. 5). The switch 116 is left open, placing both of the lights 143 and 144 in series across the power supply. This causes the green light to cease to glow brightly and instead both the green and red lights will glow dully to indicate that the parts are operating and that the gyroscope is neither fully caged nor fully uncaged.

The ring 73 continues to move downwardly until the toe 86 snaps into the outer annular groove 92. Simultaneously, the resiliently mounted roller 82 is brought into engagement with the torque ring or track 83 on the outer gimbal 29. As the toe 86 snaps into the groove 92 the resulting movement of the lever 84 and solenoid plunger 108 causes actuation of the transfer switch 114 which transfers control of the motor 72 to the reversing switch 94.

The position of the reversing switch 94 will depend upon what has happened in the meantime to the sensing probe 49 as it was moved down by the annular plate 61. If the roller 51 has gone into engagement with the high segment 43 on the disc 41 (see 51a, Fig. 10) then the downward movement of the actuating member 58 will have been halted at such a position that the switch operating probe 93 is still engaged with the cam surface 59a. In this event the motor 72 continues to rotate in the same direction since the reversing switch 94 has not been operated. Continued rotation of the motor 72 in the forward direction causes the roller 82 to move around on the torque ring 83 until it snaps into the notch 85 therein, whereupon the outer gimbal 29 is firmly latched or coupled to the actuating member 58 and torque is applied to gimbal 29 through the torque pin 81. This torque applied to the gimbal 29 is in the proper direction to cause the inner gimbal 31 to precess so as to rotate the disc 41 counter-clockwise to the position shown in Fig. 6, thereby bringing the probe 49 into registry with the notch 47.

Reverting now for a moment, let it be assumed that the disc 41 was in such position that the lower segment 42 was in registry with the probe 49. In this event, when the roller 51 engages the segment 42, the actuating member 58 will have been moved down to such a position that the switch probe 93 has been moved outwardly by engagement with the cam segment or section 59b. In this event, the reversing switch 94 will have been operated to its lower position in Fig. 14 and the motor 72 will have been reversed, thus the actuating member 58 will now be caused to rotate in the opposite direction as before described the roller 82 will ride on the torque ring 83 until it snaps into the notch 85. Now, however, the torque applied to the outer gimbal 29 will be in the opposite direction and the inner gimbal 31 will precess so as to cause the disc 41 to rotate to the position shown in Fig. 6.

Thus it will be seen that no matter how the inner gimbal is positioned with respect to the outer gimbal, the sensing means will operate so as to cause the inner gimbal to be moved to its caged position with respect to the outer gimbal so that the probe 49 may move into the notch 47 and thus latch the inner gimbal to the outer gimbal in caged position.

When the roller 51 registers with the notch 47 the probe 49 will move downward under the compression force of the spring 87. Said movement will be stopped by engagement of the upper roller 96 on the probe 49 with the track 97. At this moment, the roller 51, will be in position 51c, shown in Fig. 10, and the probe 93 will be bearing against either the segment 59c or the segment 59cc on the hub 59. Thus, the inner gimbal 31 will be fixed or latched in its caged position to the outer gimbal 29, although this latching will be rather loose as shown in Fig. 10. Whereas the outer gimbal 29 was virtually immovable as long as the inner gimbal was allowed to precess, once the inner gimbal is latched to the outer gimbal, the outer gimbal may be readily rotated by virtue of the torque applied to it through the torque pin 81.

The direction of the torque applied to the outer gimbal 29, will be dependent upon the reversing switch 94 which will have been actuated to such a position by either the cam 59c or the cam 59cc that a minimum length of travel is required to bring the roller 96 into registry with the notch 104 in the track 97. Hence, the motor 72 now drives the hub 69 and the outer gimbal 29 so as to rotate the outer gimbal until the roller 96 drops into the notch 104 on the track 97.

When this occurs both rollers 96 and 51 will firmly seat in their respective notches, thus caging the outer gimbal 29 to the frame 21 and also removing the tolerance in the caging of the inner gimbal to the outer gimbal as the roller 51 drops into the tapered portion 48 of the notch 47.

As the roller 96 drops into the notch 104 it moves the leaf spring 127 down thereby operating the caged switch 123 through the pin 124. This moves the caged switch 123 to its lower position in Fig. 14 de-energizing the motor 72 and shunting the green signal light 143. This operation causes the red light 144 to glow brightly indicating that the gyroscope is now in fully caged position.

Energization of the solenoid 107 continues to keep the actuating member 58 pressed downward into caged position by virtue of the continued engagement of the toe 86 in the groove 92.

Uncaging is effected simply by opening the switch 137. Such opening de-energizes the solenoid 107 allowing spring 109 to retract toe 86 thus allowing the driving ring 73 to be driven quickly and linearly upward in the cavity 74 of the hub 59 by spring 87. This operation is accompanied by a rapid lifting of the entire actuating member 58 by virtue of the spring 88. This rapid and linear lifting of the actuating member 58 releases the outer gimbal 29 and simultaneously releases the inner gimbal 31. The caging mechanism parts thus quickly resume their de-energized positions in which both gimbals are free. This release it will be noted occurs rapidly and without any disturbance or kicks which might impart an undesired torque to either gimbal.

In this releasing operation the caged switch is first moved to its upper position in Fig. 14 and immediately thereafter the uncaged switch is closed as the annular plate 61 engages the pin 118 (Fig. 5) to close the switch 116. Thus the lamp 144 will burn dimly in series with lamp 143 for a moment (during uncaging operation) and then go dark as lamp 143 attains full brilliance indicating that the gyroscope is in uncaged position.

It will be noted that should the uncaging be impeded, the two lamps will burn dimly thus indicating to the operator a malfunctioning of the apparatus. Thus no phase of the operation is indicated by a dark lamp, which would be ambiguous with a burned-out lamp.

From the above description, it is noted that the caging operation is effected by a rotary motion of the driving ring 73. This rotary motion by virtue of the thread 76 may be made against the opposition of strong springs 88 and 87, without requiring much operating power; at the same time the springs 87 and 88 may be made strong enough to overcome any high accelerations in the air vehicle. At the same time the uncaging operation is achieved by a linear motion of the driving ring 73 thereby being effected rapidly and without undesirable disturbance of the gimbals.

It will be further noted that the system is a fail-safe system in that if the power should be cut off, either during the operation of the mechanism or when it is being maintained in caged position, it will immediately revert to uncaged position which is the safer of the two possible attitudes of the system.

While the modification shown in Figs. 15 and 16 is more suited for low G work than for high G work, it does have the advantage of simplicity in that not as many moving parts are required and the transfer switch may be eliminated. The transfer switch is required in the first embodiment because of the danger that the reversing switch 94 might be operated before the thread engaging toe 86 has snapped into the upper groove 92, in which event the screw down operation would be reversed prior to completion.

While the instant invention has been shown and described herein in what is conceived to be the most practical and preferred embodiment, it is recognized that departures may be made therefrom within the scope of the invention which is therefore not to be limited to the details disclosed herein but is to be accorded the full scope of the claims.

What is claimed is:

1. Apparatus for caging a gyroscope having a frame and a plurality of gimbals successively rotatably mounted, one within the other, and a rotor pivotally mounted to the innermost of said gimbals, comprising: means for rotating one of said gimbals with respect to the gimbal within which one said gimbal is mounted, means for latching said one gimbal to said gimbal within which said one gimbal is mounted, means for rotating another gimbal within its mounting, and means for latching said other gimbal to its mounting.

2. Apparatus for caging a gyroscope having a frame, an outer gimbal pivotally mounted to said frame, an inner gimbal pivotally mounted to said outer gimbal, and a rotor pivotally mounted to said inner gimbal, comprising: means for applying a torque to one of said gimbals, thereby to precess the other of said gimbals into caged position, means for latching said gimbals together, means for rotating said one gimbal into caged position, and means for latching said one gimbal in caged position following caging thereof.

3. Apparatus according to claim 2, wherein said one gimbal rotating means comprises means for continuing application of torque to said one gimbal.

4. Apparatus for caging a gyroscope having a frame, an outer gimbal pivotally mounted to said frame, an inner gimbal pivotally mounted to said outer gimbal, and a rotor pivotally mounted to said inner gimbal, comprising: means for rotating said inner gimbal into caged position with respect to said outer gimbal, means for latching said inner gimbal to said outer gimbal in caged position of said inner gimbal, means for rotating said outer gimbal to caged position in said frame, and means for latching said outer gimbal in caged position, with respect to said frame.

5. Apparatus for caging a gyroscope having a frame, an outer gimbal pivotally mounted to said frame, an inner gimbal pivotally mounted to said outer gimbal, and a rotor pivotally mounted to said inner gimbal, comprising: means for applying a torque to said outer gimbal thereby to precess said inner gimbal into caged position, and means for rotating said outer gimbal into caged position following caging of said inner gimbal.

6. Apparatus for caging a gyroscope having a frame, an outer gimbal pivotally mounted to said frame, an inner gimbal pivotally mounted to said outer gimbal, and a rotor pivotally mounted to said inner gimbal, comprising means for applying a torque to said outer gimbal thereby to precess said inner gimbal into caged position, means for latching said inner gimbal to said outer gimbal in the caged position of said inner gimbal, means for rotating said outer gimbal into caged position following caging of said inner gimbal, and means for latching said outer gimbal to said frame in caged position of said outer gimbal.

7. Apparatus for caging a gyroscope having a frame, an outer gimbal pivotally mounted to said frame, an inner gimbal pivotally mounted to said outer gimbal, and a rotor pivotally mounted to said inner gimbal, comprising: means for effecting a torque, means for coupling said torque means to said outer gimbal, thereby to precess said inner gimbal into caged position, means for latching said inner gimbal to said outer gimbal in caged position of said inner gimbal, means for effecting continued application of torque to said outer gimbal from said torque means thereby to rotate said outer gimbal into caged position following caging of said inner gimbal, and means for latching said outer gimbal to said frame in caged position of said outer gimbal.

8. Apparatus for caging a gyroscope having a frame, an outer gimbal pivoted to said frame, an inner gimbal pivoted to said outer gimbal and a rotor pivoted to said inner gimbal, comprising: rotative drive means mounted on said frame, coaxially with said outer gimbal, means for latching said drive means to said outer gimbal thereby to effect application of a torque to said outer gimbal by said drive means, and to thus precess said inner gimbal into caged position, means for latching said inner gimbal to said outer gimbal in the caged position of said inner gimbal after said inner gimbal has precessed into caged position, means for latching said outer gimbal to said frame in caged position after said outer gimbal has been rotated into caged position by said drive means, and means for de-energizing said drive means in response to latching of said outer gimbal in its caged position.

9. Apparatus for caging a gyroscope having a frame, an outer gimbal pivoted to said frame, an inner gimbal pivoted to said outer gimbal, and a rotor pivoted to said inner gimbal, comprising: rotative drive means mounted on said frame coaxially with said outer gimbal, means for latching said drive means to said outer gimbal thereby to effect application of a torque to said outer gimbal by said drive means and to thus precess said inner gimbal into caged position, inner gimbal sensing means for sensing the position of said inner gimbal with respect to said outer gimbal, means for controlling the direction of torque applied to said outer gimbal by said drive means in response to said inner gimbal sensing means, means for latching said inner gimbal to said outer gimbal in the caged position of said inner gimbal after said inner gimbal has precessed to said caged position, outer gimbal sensing means for sensing the position of said outer gimbal in said frame, means for controlling the direction of torque applied to said outer gimbal by said drive means in response to said outer gimbal sensing means, means for latching said outer gimbal to said frame in caged position after said outer gimbal has been rotated into caged position by said drive means, and means for de-energizing said drive means in response to latching of said outer gimbal with respect to said frame.

10. Apparatus in accordance with claim 9 wherein said inner gimbal sensing means comprises: a disc secured coaxially to said inner gimbal and having at least two peripheral segments of different radius, and a notch formed in the periphery of said disc between said two segments, a latching and sensing member movably mounted in said outer gimbal and effective to be engaged with the periphery of said disc, said rotative drive means comprising a ring-like actuating member mounted for axial and rotative movement, said actuating member comprising a central portion and an annular plate rotatably secured to said central portion and having a peripheral groove therearound, said sensing member being engaged in said plate groove to be actuated back and forth by axial movement of said actuating member, said actuating member having on the outer surface of said central portion a plurality of annular cam surfaces, means for moving said actuating member axially, reversing switch means having an operating member in engagement with said cam surfaces to be actuated in accordance with the axial position of said actuating member, an electric drive motor coupled to said actuating member to rotate the same, circuit means interconnecting said reversing switch means with said motor to control the direction of rotation of said motor in accordance with the axial position of said actuating member, said outer gimbal sensing means being comprised of a portion of said annular cam surfaces on said actuating member, one arcuate segment of said portion being of a given radius and another arcuate segment of said portion being of a different radius, thereby to determine the attitude of said reversing switch in accordance with the angular position of said actuating member, said outer gimbal latching means comprising circular track means secured to said frame and having a notch therein, said inner gimbal sensing member having a portion riding on said track means and engageable in said notch when said outer gimbal is in its caged position, said drive means de-energizing means comprising caging switch means connected in the energizing circuit for said drive motor, and an operating member for said caging switch means operable in response to engagement of said inner gimbal sensing member in said rail notch.

11. Apparatus in accordance with claim 10 wherein said actuating member moving means comprises a driving ring disposed within said actuating member central portion and keyed thereto, said driving ring being threaded internally, a thread engaging member movably mounted on said frame and selectively engageable with said driving ring threads to effect axial movement of said ring upon rotation thereof, resilient means axially interconnecting said driving ring and said actuating member, and means biasing said driving ring with respect to said frame away from said outer gimbal.

12. Apparatus according to claim 10 wherein said actuating member moving means comprises solenoid means having operating means effective to move said actuating member axially toward said outer gimbal.

13. Method of caging a gyroscope including a frame, an outer gimbal pivoted to said frame, an inner gimbal pivoted to said outer gimbal, and a rotor pivoted to said inner gimbal, comprising: precessing said inner gimbal by applying a torque to said outer gimbal until said inner gimbal has arrived at caged position, latching said inner gimbal to said outer gimbal in caged position, rotating said outer gimbal in said frame until said outer gimbal has reached caged position, and latching said outer gimbal to said frame in its caged position.

14. Method of caging a gyroscope including a frame, an outer gimbal pivoted to said frame, an inner gimbal pivoted to said outer gimbal and a rotor pivoted to said inner gimbal, comprising: sensing the position of said inner gimbal with respect to said outer gimbal, precessing said inner gimbal in a predetermined direction in accordance with said sensing by applying a torque to said outer gimbal until said inner gimbal has arrived at caged position, latching said inner gimbal to said outer gimbal in caged position of said inner gimbal, sensing the position of said outer gimbal with respect to said frame, rotating said outer gimbal in said frame in accordance with the sensed position thereof until said outer gimbal has reached caged position, and latching said outer gimbal to said frame in caged position of said outer gimbal.

15. Method of caging a gyroscope including a frame, an outer gimbal pivoted to said frame, an inner gimbal pivoted to said outer gimbal, and a rotor pivoted to said inner gimbal, comprising: rotating said inner gimbal to caged position with respect to said outer gimbal, latching said inner gimbal to said outer gimbal in caged position of said inner gimbal, rotating said outer gimbal to caged position with respect to said frame, and latching said outer gimbal to said frame in caged position of said outer gimbal.

References Cited in the file of this patent
UNITED STATES PATENTS

| | | |
|---|---|---|
| 2,124,817 | Fieux | July 26, 1938 |
| 2,182,201 | Harris | Dec. 5, 1939 |
| 2,383,663 | MacCallum et al. | Aug. 28, 1945 |
| 2,384,310 | Judd | Sept. 4, 1945 |
| 2,410,002 | Bach | Oct. 29, 1946 |
| 2,436,407 | Stephens | Feb. 24, 1948 |
| 2,441,307 | Alkan | May 11, 1948 |
| 2,469,782 | Phair | May 10, 1949 |
| 2,513,383 | Van Armbruster | July 4, 1950 |
| 2,591,741 | Stone | Apr. 8, 1952 |
| 2,645,129 | Brown | July 14, 1953 |